Nov. 10, 1959 B. McKIM 2,912,511

TRANSLATOR USING DIODES AND TRANSFORMERS

Filed Aug. 24, 1956 2 Sheets-Sheet 1

INVENTOR
B. McKIM
BY [signature]
ATTORNEY

TRANSLATOR USING DIODES AND TRANSFORMERS

INVENTOR
B. McKIM
BY [signature]
ATTORNEY

United States Patent Office 2,912,511
Patented Nov. 10, 1959

2,912,511

TRANSLATOR USING DIODES AND TRANSFORMERS

Burton McKim, Morristown, N.J., assignor to Bell Telephone Laboratories, Incorporated, New York, N.Y., a corporation of New York Application August 24, 1956, Serial No. 605,999

4 Claims. (Cl. 179—18)

This invention relates to electrical code translators and more particularly to translators which employ passive network elements.

The input signals to communication switching systems represent either data to be processed by the system or coded instructions which specifiy procedures to be followed. Translators are employed in such systems to convert switching information from one code form to a more convenient form and to examine and classify this information to provide instructions to the switching system. This invention accomplishes both of these functions. Heretofore translators have employed relays, stepping switches or resistor and diode networks; however, translators comprising these components require a considerable amount of power from the input sources and, in addition, relays and stepping switches are slow operating, bulky and expensive.

It is an object of this invention to provide an inexpensive, flexible, high speed and reliable code translator having a minimum number of components.

Another object of this invention is to minimize the power required from the input sources.

In accordance with one feature of this invention diode and transformer networks are interconnected to form a high speed flexible translating structure which can be arranged to accept any one of a plurality of input codes with a minimum number of circuit components.

In accordance with another feature of this invention, diodes and transformers are interconnected to form a translating structure which selectively provides combinations of low impedance electrical paths between input and output conductors. Only the electrical paths rendered conductive by the input signals consume power from the input sources.

In large multioffice telephone switching systems, the first three digits of subscriber directory numbers are office code digits identifying the local office in which the subscriber line terminates. When a call is initiated, the directory number is dialed and the digits are stored in common central office equipment, known as registers, which are responsive to the pulses incoming from the calling party. After registration is accomplished, the information is passed to one or more translators to select an outgoing trunk and to effect the extension of the call to a called subscriber line. The registered office code information may be indicated to the translator equipment by input conductors according to any of a plurality of different known codes, such as a decimal code or a bi-quinary code or combinations of these and the output information from the translator may be indicated by information on the output conductors according to the same or a different code.

The first three, or office code digits, which are designated A, B, and C, respectively, are processed in a yes-no translator to determine whether the called subscriber station is within range of the local circuits of the switching exchange or if a sender is required to complete the call to stations outside the range of its local circuits.

These digits, which have been stored in the A, B, and C registers are read out in parallel to provide input pulses to a translating network which is arranged to give a yes or no answer to the switching system. If a yes answer is obtained a sender is seized and the yes-no translator equipment is dismissed; however, if a no answer is obtained the local circuits are energized to complete the call and again the translator equipment is dismissed.

In one illustrative embodiment of this invention the translating circuit is arranged to accept A digit information in a bi-quinary code and B and C digit information in a decimal code. Special provisions are made for service code calls, such as repair service and information, in which the first three digits are of the from 11X. The registers are arranged to provide an output on a single conductor for the 11 digits of such a call and the X digit is entered in the translator as though it were an A digit of a call to a subscribed station.

In another embodiment of this invention means are provided to accept register output information in a two-out-of-five code for all three digits. Again the service code calls are handled on the above special basis.

The invention and the above-noted features thereof will be understood more clearly and fully from the following detailed description with reference to the accompanying drawing in which.

Figure 1:
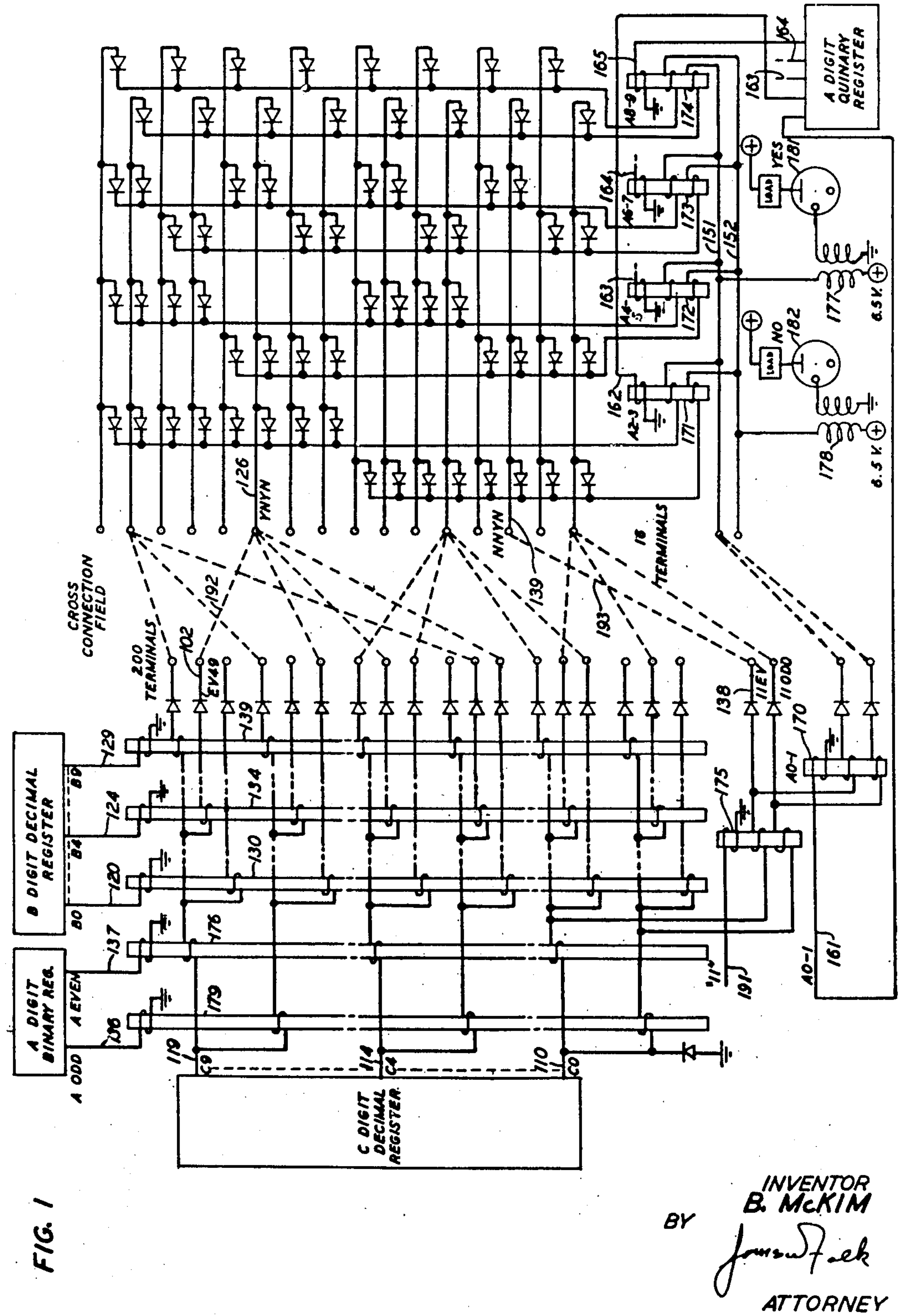
Fig. 1 is a translating circuit which accepts bi-quinary and decimal input information.

Fig. 1 is an example of a network which advantageously employs diodes and multiwinding linear code transformers to provide a reliable, high speed yes-no translator which consumes a minimum amount of power from the control sources. In this arrangement the A digit register accepts serial decimal input information from the calling line and provides parallel bi-quinary information to the A digit conductors of the translator. The quinary portion of the A register output code is connected to the translator by conductors A0–1, A2–3, A4–5, A6–7, and A8–9, which are shown near the bottom of Fig. 1 and are designated 161 to 165, respectively. A choice of the odd or even digit of conductors 161 through 165 is made by the binary portion of the A digit output code which is connected to the translator by the odd and even conductors 136 and 137. The B and C digit registers also accept serial decimal input information from the calling line; however, unlike the A digit register they provide parallel decimal information to the translator over conductors B0 through B9 and C0 through C9. The B and C digit conductors are represented in the drawing by the B0, B4, B9 and C0, C4, and C9 conductors, identified as 120, 124, 129, 110, 114, and 119 respectively.

The service code registers are arranged to provide a single input on the 11 code conductor 191 for the first two digits of a call of the form 11X and an input in bi-quinary form to the A conductors for the X digit.

The linear code transformers 176, 179, and 130 through 139 each have a single primary and twenty secondary windings with a 1:1 turns ratio between the primary and each secondary. The linear transformers 170 through 175 each have a primary winding and two secondary windings and are similarly 1:1 transformers.

The pluralities of diodes at the left and right side of the cross-connection field shown in the center of Fig. 1 are provided to prevent back-up currents. The cross-connections of Fig. 1 are provided locally as dictated by the assignments of the various office trunk groups and those shown have been arbitrarily assigned.

Figures 2, 3, 4, 5:
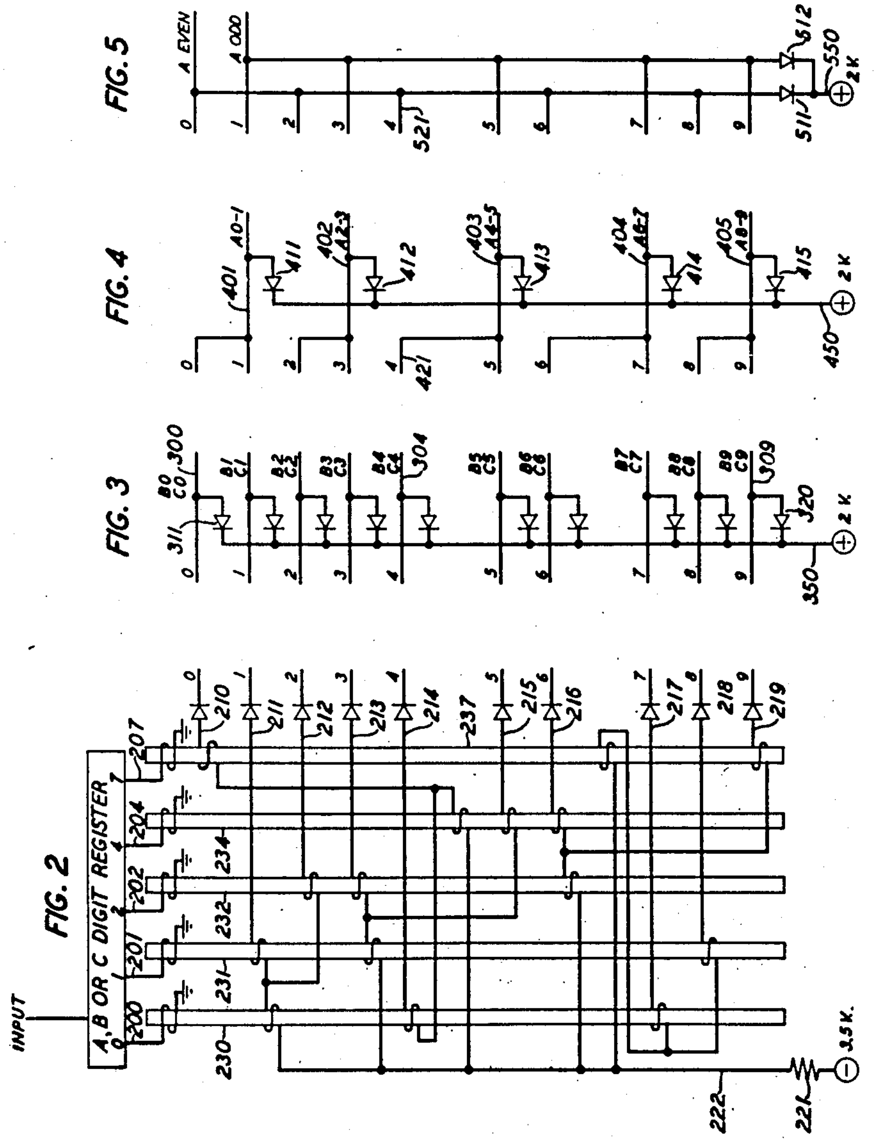
Fig. 2 is a code translator in accordance with the present invention for translating a two-out-of-five code to a decimal code.
Fig. 3 is an arrangement for connecting the output conductors of Fig. 2 to a portion of the input conductors of Fig. 1.
Figs. 4 and 5 are clipping and combining circuits for connecting the output conductors of Fig. 2 to other input conductors of Fig. 1.

A code translator which practices the features of this invention to convert input information in a two-out-of-five combinational code to decimal output information is shown in Fig. 2. A two-out-of-five code is a self checking code employing five elements having the values 0, 1, 2, 4, and 7. In each instance, two of the five elements are energized and the value assigned to the code is the sum of the values assigned to the energized elements except in the case of 0, which is represented by energizing or providing information representative of energization of the elements 4 and 7. In this example the A, B, and C digit registers are identical arrangements which accept serial decimal input information from the calling line and provide parallel information in a two-out-of-five code on conductors 200, 201, 202, 204, and 207. Linear transformers 230, 231, 232, 234, and 237 each have a single primary and a plurality of secondary windings and in each case a 1:1 turns ratio prevails between the primary and each secondary winding. Diodes 210 through 219 are provided to prevent back-up currents between decimal output conductors 0 through 9.

The circuit arrangements of Figs. 3, 4, and 5 are provided as connecting means between the output conductors of the Fig. 2 code translator and the Fig. 1 yes-no translator. Fig. 3 is an arrangement for connecting the decimal output conductors of Fig. 2 to decimal input conductors of Fig. 1 and it merely provides means for limiting the magnitude of the input pulses delivered to conductors of Fig. 1. Fig. 4 is a circuit arrangement which pairs the decimal output conductors of Fig. 2 to provide the quinary input conductors required in Fig. 1 and also limits the magnitude of the pulses delivered to these conductors. Fig. 5 combines the odd and even numbered decimal conductors of Fig. 2 to provide for connections to the odd and even conductors of Fig. 1 and also limits the magnitude of the pulses delivered to these conductors.

A detailed explanation of the yes-no translator of Fig. 1 with bi-quinary and decimal input code information is followed by an explanation of the translating and connecting circuits of Figs. 2 through 5.

In the following explanation of Fig. 1 it is assumed that the office code digits of the input code to be examined are 449. The registers in which this information is stored will provide coincident two-volt pulses to each of the following code conductors; A even, A4–5, B4, and C9. Such pulses by transformer action, will combine to produce a six-volt pulse on the EV49 conductor 102 at the left side of the cross-connect field. As dictated by the requirements of the switching center in which the translator is to be used, a cross-connecting conductor 192 provides an electrical path between the EV49 conductor 102 and conductor 126 which is designated YNYN. This designation means that the conductor is connected to the yes bus bar 151 for A digit inputs of 2, 3, 6, and 7 and to the no bus bar 152 for A digit inputs of 4, 5, 8, and 9. In the example, the six-volt pulse which occurs at conductor 102, will combine with the coincident two-volt pulse which is applied to the A4–5 conductor 163 to provide an eight-volt pulse at conductor 152. This eight-volt pulse will cause sufficient current to flow in transformer winding 178 to effect firing of the no gas tube 182. This thereby indicates that a call to a telephone number in which the office code digits are 449 is to a local area and that a sender is not required to complete the call. The voltages on all of the conductors, other than the selected one, at the left side of the cross-connect field will be zero, two or four volts and in each case the combining of one of these lower voltage pulses with a coincident pulse on one of the four groups of A conductors at the right side of the cross-connect field will be insufficient to overcome the six and one-half volt bias provided at transformer windings 177 and 178. Current will, therefore, flow only in the selected conductors.

Figure 6:
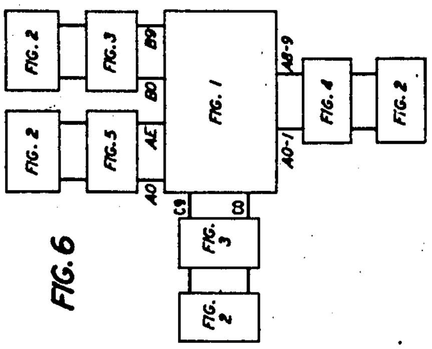
Fig. 6 shows the arrangement of the foregoing figures to constitute a translator which accepts input information from the registers comprising signals on two-out-of-five input conductors for each of the digits to be examined.

Service calls, such as those to repair service, in which the three digits are of the form 11X, when registered, provide a four-volt pulse on the 11 code conductor 191 and coincident two-volt pulses on the A odd or A even conductor and on one of the conductors 161 through 165. The X is treated as an A digit. For example, a call in which the three digits are 114 will provide a four-volt pulse on the 11 code conductor 191, a two-volt pulse on the A even conductor 137 and a two-volt pulse on the A4–5 conductor 163. The coincident pulses on conductor 191 and the A even conductor will, by transformer action, provide a six-volt pulse on the 11EV conductor 138 at the left side of the cross-connect field. An arbitrary cross-connecting conductor 193 provides a path from the 11EV conductor 138 to the NNYN conductor 139. The six-volt pulse on conductor 138 will combine with the two-volt pulse on conductor 163 to provide an eight-volt pulse on the no bus bar 152. This eight-volt pulse will cause sufficient current to flow in transformer winding 178 to effect firing of the no gas tube 182.

Where the registers store the information in a two-out-of-five code the circuits of Figs. 2 through 5 connected to Fig. 1, as shown in Fig. 6, may advantageously be utilized. The circuit of Fig. 2 translates a two-out-of-five code to a decimal code and Figs. 3, 4, and 5 provide connecting circuits between Fig. 2 and Fig. 1. Again assume that an input code of 449 is to be examined. The A, B, and C digit registers of this arrangement provide three-volt output pulses, therefore, in the two Figs. 2 associated with the A digit, coincident three-volt input pulses are provided on the 0 and 4 conductors 200 and 204; coincident three-volt pulses are provided on the 0 and 4 conductors 200 and 204 of the Fig. 2 associated with the B digit; and coincident three-volt pulses are provided on the 2 and 7 conductors 202 and 207 of the Fig. 2 associated with the C digit.

Coincident input pulses on the 0 conductor 200 and the 4 conductor 204 will effect an output pulse on the 4 output conductor 214. The negative three and one-half volt potential applied to conductor 222 through resistor 221 will limit the magnitude of the pulse on conductor 214 to the difference between the sum of the input pulses, positive six volts, and the bias potential of negative three and one-half volts, therefore, a positive pulse having an open circuit voltage of approximately two and one-half volts appears on conductor 214. The operation of Fig. 2 is identical for the two Figs. 2 associated with the A digit and the one Fig. 2 associated with the B digit as in all three cases the input is on conductor 200 and 204. The decimal output conductors 210 through 219 of the first Fig. 2 associated with the A digit are connected to Fig. 4 to provide five conductors which correspond to the quinary code pairs of odd and even A digit numbers, the output conductors 210 through 219 of the second Fig. 2 are connected to Fig. 5 to provide the A odd and A even output conductors and the output conductors of the third and fourth Figs. 2 are connected to two Figs. 3 to provide the B and C decimal conductors. In Figs. 3, 4, and 5 a positive two-volt potential applied to conductors 350, 450, and 550 in conjunction with diodes 311 through 320, 411 through 415, and 511 and 512 serves to limit the amplitude of the output pulses in these figures to positive two volts. The input pulses to Fig. 1 are, therefore, of uniform amplitude.

In the example, input information indicative of a call to a telephone number having office code digits of 449 when presented to the four Figs. 2 connected, as shown in Fig. 6, will produce two-volt input pulses on the A even, A4–5, B4 and C9 conductors of Fig. 1. The remainder of the operation being as described for bi-quinary and decimal input codes to Fig. 1.

It is to be understood that the above-described arrangements are illustrative of the principles of the invention. Numerous other arrangements may be devised by those skilled in the art without departing from the spirit and scope of the invention.

What is claimed is:

1. A translator comprising a plurality of input conductors, a plurality of output conductors, means for applying discrete combinations of potentials to said input conductors, a first plurality of transformers connected to said input conductors, a first plurality of asymmetrical circuit elements connected to said first plurality of transformers, a second plurality of asymmetrical circuit elements connected to said output conductors, a second plurality of transformers connected between said first and second pluralities of asymmetrical circuit elements, a third plurality of transformers connected to said output conductors, means including said pluralities of transformers and said pluralities of asymmetrical circuit elements to provide low impedance electrical paths between said input conductors and any of said output conductors, switching means responsive to operative energization of said output conductors, and a source of biasing potential connected to said switching means to limit responses in said switching means to signals of a determined minimum amplitude.

2. In a telephone system an electrical circuit for distinguishing between signals of two groups of signal codes comprising a first plurality of transformers each having an input winding and a plurality of output windings thereon, means for applying signals of predetermined potential representing certain elements of said codes to input windings of said first plurality of transformers, a second plurality of transformers each having an input winding and a plurality of output windings thereon, means for applying signals of predetermined potential representing other elements of said codes to input windings of said second plurality of transformers, means including diode network means selectively connecting said first transformer output windings and certain output windings of said second plurality of transformers in accordance with predetermined patterns, first potential bias means connected to one output winding of each of said second transformers and second potential bias means connected to another output winding of each of said second transformers, and means individual to each of said bias means for detecting flow of current through said output windings of said second transformers on occurrence of predetermined input signals to said first and second transformers effective at one of said second transformer output windings to overcome the bias means connected to said output windings of said second plurality of transformers, whereby one of said detection means is activated on occurrence of a signal of the form of one of said two groups of signal codes and the other of said detection means is activated on occurrence of a signal of the other of said two groups of signal codes.

3. In a telephone system the combination in accordance with claim 2 further comprising first and second digit register means each having a plurality of output conductors, each of said conductors being connected to an input winding of said first transformers, and third digit register means having a plurality of output conductors each connected to an input winding of one of said second transformers.

4. In a telephone system in accordance with claim 3 wherein the information in said first and second register means is in decimal code and the information in said third register means is in quinary form, the combination further comprising fourth digit register means having a pair of outputs, one of said outputs being connected to an input winding of one of said first transformers and the other of said output conductors being connected to an input winding of another of said first transformers.

References Cited in the file of this patent

UNITED STATES PATENTS

| | | |
|---|---|---|
| 2,265,844 | Korn | Dec. 9, 1941 |
| 2,614,176 | Dimond | Oct. 14, 1952 |
| 2,657,272 | Dimond | Oct. 17, 1953 |
| 2,695,397 | Anderson | Nov. 23, 1954 |
| 2,719,962 | Karnaugh | Oct. 4, 1955 |
| 2,740,949 | Counihan et al. | Apr. 3, 1956 |
| 2,817,079 | Young | Dec. 17, 1957 |